G. W. SANDIFORD.
TROLLEY GUARD.
APPLICATION FILED OCT. 5, 1908.
918,377.
Patented Apr. 13, 1909.
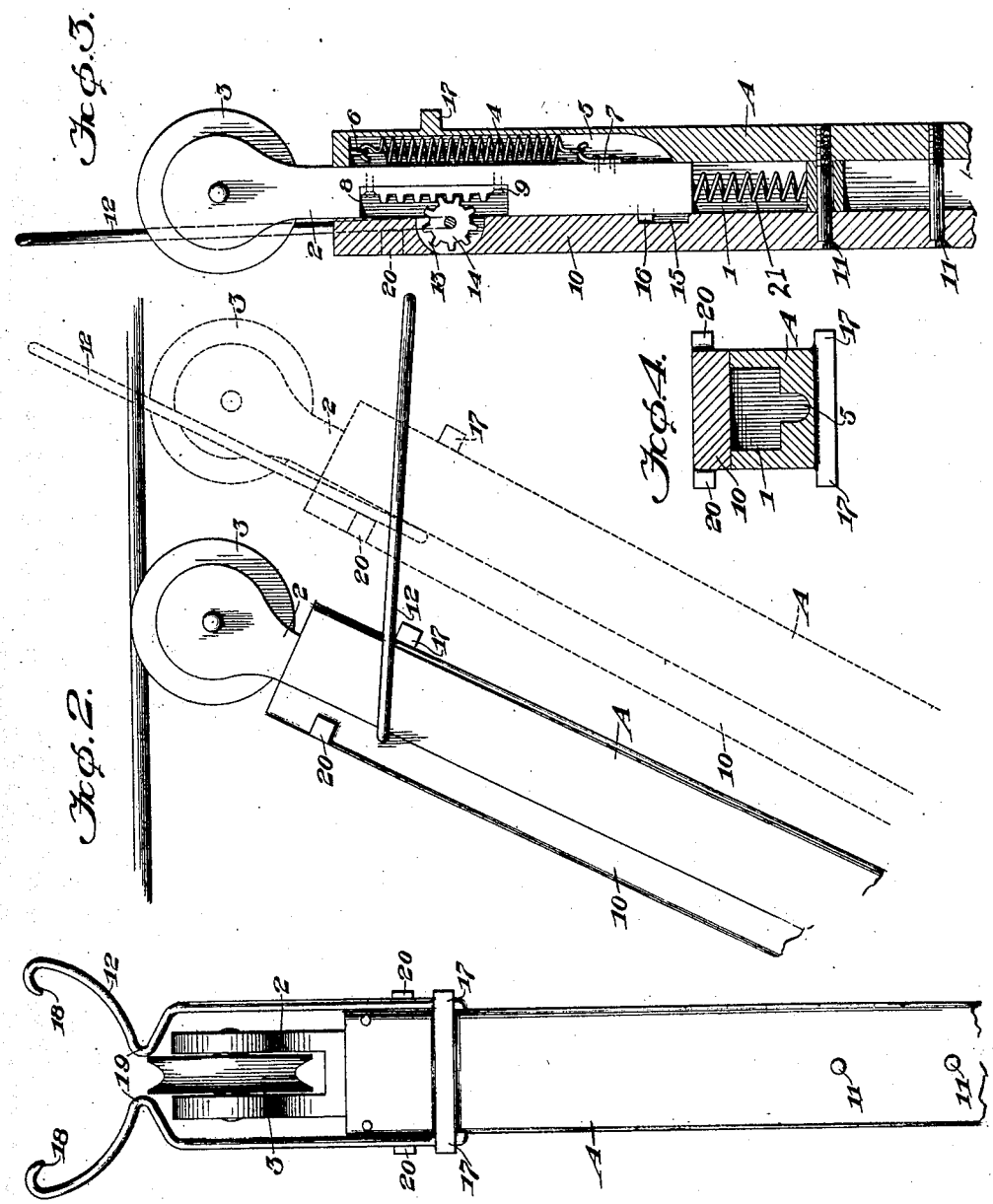

UNITED STATES PATENT OFFICE.

GREEN WOODRUFF SANDIFORD, OF MOBILE, ALABAMA, ASSIGNOR OF ONE-FOURTH TO JOSEPH R. TAPIA AND ONE-FOURTH TO J. I. CLEMMONS, BOTH OF MOBILE COUNTY, ALABAMA.

TROLLEY-GUARD.

No. 918,377.     Specification of Letters Patent.     Patented April 13, 1909.

Application filed October 5, 1908. Serial No. 456,173.

*To all whom it may concern:*

Be it known that I, GREEN WOODRUFF SANDIFORD, a citizen of the United States, residing at Mobile, in the county of Mobile and State of Alabama, have invented certain new and useful Improvements in Trolley-Guards, of which the following is a specification.

My invention relates to an improvement in trolley guards, and the object is to provide means for causing the return of the trolley wire to the trolley wheel whenever the trolley wheel jumps the wire.

A further object is in the provision of a guard whereby the wire can be located and caused to enter the groove on the trolley wheel much easier than is possible without the use of the guard on the trolley wheel.

The invention further consists of certain novel features of construction and combinations of parts, which will be hereinafter fully described and pointed out in the claims.

In the accompanying drawings: Figure 1 is a view in front elevation; Fig. 2 is a view in side elevation; Fig. 3 is a vertical sectional view; Fig. 4 is a cross section.

A represents the trolley pole, which is provided with a vertical slot 1 at its upper end in which is received a sliding member 2. Journaled in the forked end of the sliding member is a trolley wheel 3. A coil spring 4 is received in a recess 5 formed in the pole and one end is connected to an eye 6 and the other end is connected to a hook 7 on the sliding member 2. A recess 8 is formed on one side of the member 2 and received in the recess is a rack bar 9. A plate 10 is connected to the pole by screws 11 for closing the slotted opening 1 and journaled in the plate is a trolley guard 12. A recess 13 is formed in the plate 10 in which is received a pinion 14 mounted on the guard 12, which is journaled in the plate. The pinion is adapted to engage the rack bar 9 whereby the guard is operated upon the movement of the trolley wheel in the slotted opening 1. A recess 15 is formed in the plate in which a stop-block 16 on the lower end of the slide member 2 is received for limiting the upward and downward movement of the member by the block coming in contact with the ends of the slot.

When the trolley wheel 3 is in engagement with the trolley wire the pressure of the wheel will cause the sliding member 2 to be forced downward into the slot 1 which causes the trolley guard to lie practically in a horizontal position against the stops 17 formed on the pole. The moment the wheel leaves the wire the coil spring 4, which is under tension while the wheel is on the wire, will cause the sliding member to be forced upwardly and through the pinion and rack bar the guard is brought upwardly and engages the wire causing the wire to enter the groove of the wheel.

The ends of the guard are curved inwardly as at 18 which are adapted to catch the wire and by the inclination of the ends of the guard the trolley wire will slide down on to the wheel 3. The guard is bent inwardly from each side as at 19 so that there is sufficient opening for the wheel to travel and to cause the wire to be fed directly on to the trolley wheel. The stops 20 on the plate 10 limit the movement of the guard to prevent the guard from traveling too far and causing injury to the pinion and other parts.

A spring 21 is mounted in the slot 1 and is connected to the bottom of the sliding member 2. The spring is adapted to assist the spring 4 in the operation of the member 2, and if for any reason the spring 4 should break or become useless the spring 21 would operate the member 2. The spring 21 is not essential, and may be omitted if desired.

From the foregoing it will be seen that I have provided a very simple and economical device for preventing the trolley wheel from jumping the wire and causing injury to the guy wires which support the main trolley wire. If the trolley should jump the wire the quick action of the guard, which is automatically operated, when the trolley leaves the wire will engage the trolley wire and cause the trolley wheel again to engage the trolley wire.

It is evident that more or less slight changes might be resorted to in the form and arrangement of the several parts described without departing from the spirit and scope of my invention and hence I do not wish to be limited to the exact construction herein set forth, but:—

Having fully described my invention, what I claim as new and desire to secure by Lette Patent, is:—

1. The combination with a trolley pole, of a member slidably received therein, a spring connected to the member tending to force the member outward, a trolley mounted on the member, a rack bar connected to the member, a guard, and a gear wheel on the guard adapted to engage the rack bar whereby the guard is actuated upon the trolley leaving the wire and by the pressure of the trolley upon the wire.

2. The combination with a trolley pole, of a sliding member mounted therein, a trolley mounted on the member, a spring connected to the member and pole, a rack bar on the member, a guard, means on the guard adapted to engage the rack whereby the guard is actuated on the movement of the member, and means for limiting the movement of the member.

3. The combination with a trolley pole, having a slotted opening formed at one end, a sliding spring controlled member received therein, a trolley mounted on the member, a rack bar connected to the member, a plate for closing the opening connected to the pole, a guard journaled on the plate, and a gear wheel on the guard adapted to engage the rack bar whereby the guard is actuated upon the movement of the member, and stops on the plate and pole for limiting the movement of the guard.

In testimony whereof I affix my signature, in the presence of two witnesses.

GREEN WOODRUFF SANDIFORD.

Witnesses:
    WM. MCCARRON,
    P. A. NIOLON.